United States Patent [19]

Sakuma et al.

[11] Patent Number: 5,695,374
[45] Date of Patent: Dec. 9, 1997

[54] NONWOVEN FABRIC FOR LINERS OF FLOPPY DISK AND PROCESS FOR PRODUCING THE SAME

[75] Inventors: Tadashi Sakuma; Keizo Takahashi, both of Tochigi-ken; Zenbei Meiwa, Wakayama-ken; Hiroshi Ikeda; Mami Murata, both of Tochigi-ken, all of Japan

[73] Assignee: Kao Corporation, Tokyo, Japan

[21] Appl. No.: 530,021

[22] Filed: Sep. 19, 1995

[30] Foreign Application Priority Data

Sep. 21, 1994 [JP] Japan .................................. 6-226198
Apr. 20, 1995 [JP] Japan .................................. 7-095570

[51] Int. Cl.⁶ .......................... B32B 33/00; G41B 23/023
[52] U.S. Cl. ...................... 442/164; 360/133; 427/389.9; 442/165
[58] Field of Search .................. 427/389.9; 428/290; 442/164, 165; 360/133

[56] References Cited

U.S. PATENT DOCUMENTS

| 4,106,067 | 8/1978 | Masuyama et al. | 360/133 |
| 4,251,843 | 2/1981 | Masuyama et al. | 360/133 |
| 4,791,516 | 12/1988 | Seto | 360/133 |
| 5,311,389 | 5/1994 | Howey | 442/165 |

*Primary Examiner*—James C. Cannon
*Attorney, Agent, or Firm*—Oblon, Spivak, McClelland, Maier & Neustadt, P.C.

[57] ABSTRACT

A nonwoven fabric for a liner of a floppy disk is characterized by a binder which is applied to the fibers of the nonwoven fabric. The binder comprises (a) an emulsion obtainable from a polymerizable unsaturated monomer having a functional group and other polymerizable unsaturated monomers capable of undergoing copolymerization with said polymerizable unsaturated monomer, and (b) a melamine compound having a methylol group.

8 Claims, No Drawings

NONWOVEN FABRIC FOR LINERS OF FLOPPY DISK AND PROCESS FOR PRODUCING THE SAME

BACKGROUND OF THE INVENTION

1. Field of the Invention

This invention relates to a nonwoven fabric for a liner of a floppy disk. More particularly, this invention relates to a nonwoven fabric for a liner of a floppy disk which does not generate dust, debris or the like, and prevents the surface of a floppy disk from being scratched or worn out. This invention also relates to a process for producing the nonwoven fabric for a liner of a floppy disk. This invention further relates to a floppy disk in which the nonwoven fabric is employed.

2. Description of Related Art

Heretofore, when conventional nonwoven fabrics are used as a liner of a floppy disk, fibers, binders and the like separate from the nonwoven fabrics, and fiber debris (i.e., lint) is thereby generated during the production and the use of the floppy disks. The lint clings to or scratches the surfaces of the floppy disks and causes disk errors to occur.

In particular, a heat emboss type liner, which is very commonly used in a 3.5-inch floppy disk cartridge, has a problem that, due to ultrasonic welding carried out during the provision of the liner or due to ultrasonic welding carried out during the sealing of shells, lint, dust, debris or the like, which has stayed on the surfaces of the liners or inside of the liners, drops to cling to the surface of the floppy disk and scratches the surface of the floppy disk, thereby reducing the regeneration output power.

In recent years, the floppy disks have been developed particularly focusing on miniaturization, increase in recording density, and enhancement of rotational speed. Therefore, there has been a strong need for a high-performance liner to meet these requirements.

SUMMARY OF THE INVENTION

It is, therefore, an object of the present invention to provide a nonwoven fabric for a liner of a floppy disk which does not generate dust, debris or the like and prevents the surface of a floppy disk from being scratched or worn out.

Another object of the present invention is to provide a process for producing the nonwoven fabric for a liner of a floppy disk.

Still another object of the present invention is to provide a floppy disk in which the nonwoven fabric is employed.

The inventors eagerly studied and found that, in particular, when a binder comprising an emulsion obtainable from specific polymerizable unsaturated monomers, and a melamine compound having a methylol group is employed, the adhesive properties of the binder with respect to fibers of a nonwoven fabric can be enhanced, and the migration of the binder to the medium of a floppy disk can be prevented.

The present invention is made on the basis of the above findings, and the object of the present invention is accomplished by a nonwoven fabric for a liner of a floppy disk, comprising fibers and a binder applied to said fibers, said binder comprising:

(a) an emulsion obtainable from a polymerizable unsaturated monomer having a functional group and other polymerizable unsaturated monomers capable of undergoing copolymerization with said polymerizable unsaturated monomer, and (b) a melamine compound having a methylol group.

The nonwoven fabric for a liner of a floppy disk in accordance with the present invention generates no or little lint and prevents the surface of a floppy disk from being scratched or worn out.

DETAILED DESCRIPTION OF THE INVENTION

The polymerizable monomer to be used in the present invention has a functional group. Any functional group having a certain degree of reactivity can be used in the present invention. The functional group is preferably selected from the group consisting of a methylol group, a carboxyl group, a hydroxyl group and an epoxy group. Examples of the polymerizable unsaturated monomers having a functional group include polymerizable unsaturated monomers having: a methylol group, such as N-monomethylol acrylamide and N-monomethylol methacrylamide; polymerizable unsaturated monomers having a carboxyl group, such as acrylic acid, methacrylic acid, maleic acid, fumaric acid, crotonic acid, and itaconic acid; polymerizable unsaturated monomers having a hydroxyl group, such as hydroxyalkyl(meth)acrylates, from example, 2-hydroxyethyl acrylate, 2-hydroxyethyl methacrylate, hydroxypropyl acrylate, and hydroxypropyl methacrylate; polymerizable unsaturated monomers having an epoxy group, such as glycidyl acrylate and glycidyl methacrylate; compounds obtained by etherifying the methylol group of N-monomethylol acrylamide or N-monomethylol methacrylamide with butanol, isobutanol or the like, such as N-butoxymethyl acrylamide, N-butoxymethyl methacrylamide, isobutoxymethyl acrylamide, and isobutoxymethyl methacrylamide; and acrylamide, but the polymerizable unsaturated monomers are not limited thereto. Among the above-enumerated polymerizable unsaturated monomers, it is preferred to use the monomers selected from the group consisting of acrylamide derivatives, such as N-monomethylol acrylamide, methacrylamide derivatives, such as N-monomethylol methacrylamide; acrylic acid; methacrylic acid; 2-hydroxyethyl acrylate; and 2-hydroxyethyl methacrylate. In the present invention, the above-enumerated polymerizable unsaturated monomers having a functional group may be used either individually or in combination of two or more thereof.

Any other polymerizable unsaturated monomer can be used in the present invention provided that such polymerizable unsaturated monomers are capable of undergoing copolymerization with the polymerizable unsaturated monomer having a functional group. Examples of the other polymerizable unsaturated monomers include acrylic acid ester derivatives and methacrylic acid ester derivatives, such as methyl acrylate, methyl methacrylate, ethyl acrylate, ethyl methacrylate, isopropyl acrylate, isopropyl methacrylate, n-butyl acrylate, n-butyl methacrylate, isobutyl acrylate, isobutyl methacrylate, n-amyl acrylate, n-amyl methacrylate, isoamyl acrylate, isoamyl methacrylate, n-hexyl acrylate, n-hexyl methacrylate, 2-ethylhexyl acrylate, 2-ethylhexyl methacrylate, octyl acrylate, octyl methacrylate, decyl acrylate, decyl methacrylate, dodecyl acrylate, dodecyl methacrylate, octadecyl acrylate, octadecyl methacrylate, cyclohexyl acrylate, cyclohexyl methacrylate, phenyl acrylate, phenyl methacrylate, benzyl acrylate, and benzyl methacrylate; vinyl esters, such as vinyl acetate and vinyl propionate; aromatic vinyl compounds, such as styrene, vinyltoluene, 2-methylstyrene, t-butylstyrene, chlorostyrene, vinylanisole, vinylnaphthalene, and divinylbenzene; amides, such as acrylamide, methacrylamide, N-monoethyl acrylamide, N-monoethyl methacrylamide, di-methyl acrylamide, dimethyl methacrylamide, t-butylacrylamide, t-butyl methacrylamide, diacetone acrylamide and diacetone methacrylamide; polyfunctional monomers, such as divinylbenzene, 1,4-butanediol diacrylate, 1,4-butanediol dimethacrylate, polyethylene glycol diacrylate, and polyethylene glycol dimethacrylate; acrylonitrile, and methacrylonitrile. Among the above-enumerated other polymerizable unsaturated monomers, acrylic acid ester derivatives and methacrylic acid ester derivatives are preferred. These other polymerizable unsaturated monomers may be used either individually or in combination of two or more thereof.

The ratio (by weight) of the total amount of the polymerizable unsaturated monomers having a functional group to the total amount of the above-mentioned other polymerizable unsaturated monomers is preferably from (0.5/99.5) to (20/80), more preferably from (3/97) to (15/85).

The melamine compounds having a methylol group to be employed in the present invention include a compound in which a hydrogen atom of an amino group in melamine has been substituted by a methylol group (methylol melamine compound); a compound in which a methylol group in the metylol melamine compound has been etherified with methanol, ethanol, isopropanol, butanol or isobutanol; and an oligomer, in which such compounds have been bonded with each other via a methylol group. No limitation is imposed on the number of the methylol groups in the melamine compound. When the melamine compound is a monomer, in general, good results can be obtained with the melamine compound having the methylol groups of 2 or more, in particular 2 to 6. As the melamine compound, commercially available compounds, for example, Sumitex Resin M-3, MK and MC supplied by Sumitomo Chemical Co., Ltd.; Aerotex M-3 and MW supplied by Cyanamid Co.; and SMF L40A and MY-V2 supplied by Nissan Chemical Industries, Ltd. can be used.

The binder employed in the present invention may be prepared by mixing the emulsion obtainable by the copolymerization (for example, emulsion polymerization which will be described later) of the polymerizable unsaturated monomer having a functional group and other .polymerizable unsaturated monomers, and the melamine compound having a methylol group with each other.

When the emulsion is applied to a nonwoven fabric web, the copolymer in the emulsion exhibits very good adhesive properties with respect to the fibers of the nonwoven fabric web. However, there is the tendency for the emulsion to easily migrate to the magnetic medium of a floppy disk. Therefore, in the present invention, the melamine compound having a methylol group is used in combination with the emulsion. In this manner, the functional groups contained in the copolymer in the emulsion react with the melamine compound (crosslinking agent) and the crosslinking density of the binder is increased so that migration of the binder to the magnetic medium of a floppy disk can be prevented.

The emulsion described above can be prepared by a known emulsion polymerization method. For example, the emulsion can be prepared by mixing the polymerizable unsaturated monomer having a functional group and the above-mentioned other polymerizable unsaturated monomers in the above-mentioned ratio to obtain a mixture, adding dropwise the resulting mixture to an appropriate amount of water containing small amounts of a polymerization initiator and an emulsifying agent, and carrying out the emulsion polymerization of the polymerizable unsaturated monomer having a functional group and the other polymerizable unsaturated monomers.

No limitation is imposed on the type of the emulsifying agent. For example, conventional anionic surface active agents, cationic surface active agents, or nonionic surface active agents may be used as the emulsifying agents.

Examples of the anionic surface active agents include alkylbenzenesulfonates, alkylnaphthalenesulfonates, and polyethylene oxide alkyl ether sulfates. In the present invention, these anionic surface active agents may be used either individually or in combination of two or more thereof.

Examples of the cationic surface active agents include primary, secondary, and tertiary amine salts having aliphatic hydrocarbon groups, and quaternary ammonium compounds having aliphatic hydrocarbon groups. In the present invention, these cationic surface active agents may be used either individually or in combination of two or more thereof.

Examples of the nonionic surface active agents include polyethylene oxide alkyl ethers, polyethylene oxide alkylphenyl ethers, and polyethylene oxide-polypropylene oxide block copolymers. In the present invention, these nonionic surface active agents may be used either individually or in combination of two or more thereof.

Also, in the present invention, for example, the anionic surface active agents and the nonionic surface active agents may be used in combination. Alternatively, the cationic surface active agents and the nonionic surface active agents may be used in combination.

No limitation is imposed on the type of the polymerization initiator. Examples of the polymerization initiator include: organic polymerization initiators which includes hydroperoxides, such as cumene hydroperoxide and di-isopropylbenzene hydroperoxide, peroxides, such as benzoyl peroxide and lauroyl peroxide, and azo compounds, such as azobisisobutyronitrile; and inorganic polymerization initiators which include persulfates, such as potassium persulfate, sodium persulfate, and ammonium persulfate. These polymerization initiators may be used either individually or in combination of two or more thereof. Also, the so-called redox polymerization initiator system in which the combination of reducing agents such as sodium bisulfite and ascorbic acid and salts thereof, and polymerization initiators are used may be employed.

In carrying out the emulsion polymerization, if necessary, it is possible to use chain-transfer agents, which are ordinarily employed in emulsion polymerization, such as n-dodecylmercaptan and t-dodecylmercaptan.

The proportion of the solid content in the emulsion obtained in the manner described above is, in general, from 3 to 50% by weight, preferably 5 to 20% by weight.

The binder used in the present invention can be obtained by mixing the emulsion obtainable by the emulsion polymerization described above, and the melamine compound having a methylol group with each other. No limitation is imposed on the ratio of the emulsion to the melamine compound. The ratio (by weight measured in the state of solid).of the emulsion to the melamine compound is preferably from (99.5:0.5) to (80:20), more preferably from (97:3) to (85:15). If the proportion of the melamine compound with respect to the emulsion is lower than 0.5, the binder may become apt to migrate to the magnetic medium of a floppy disk. If the proportion of the melamine compound with respect to the emulsion is higher than 20, the obtained nonwoven fabric may become very hard and may become apt to scratch the magnetic medium of the floppy disk, or the stability of the binder may become low.

If necessary, various additives, for example, nonionic surface active agents, such as polyoxyethylene nonylphenyl ether, and anionic surface active agents, such as sodium dodecyl sulfate, may be added to the binder thus obtained. The amount of the additives preferably ranges from 0.1 to 5.0% based on the weight of the binder. If necessary, anti-static agents, mildew-proofing agents and the like may also be added to the binder.

The proportion of the binder used in the nonwoven fabric in accordance with the present invention is preferably from 10 to 50% by weight (solid content) based on the weight of the fibers constituting the nonwoven fabric of the present invention, more preferably from 10 to 30% by weight (solid content). If the proportion of the binder is lower than 10% by weight, the adhesion of the binder may become low, and the form of the liner may not be kept. If the proportion of the binder used is higher than 50% by weight, sufficient cleaning effects may not be obtained. Also, friction and wear between the binder and the magnetic medium of a floppy disk may cause flaws formed on the surface of the magnetic medium, thereby causing failures in regeneration of information in the floppy disk. Therefore, the above range is preferred.

No limitation is imposed on the type of the fibers constituting the nonwoven fabric in accordance with the present invention, and any of known fibers may be employed. For example, it is possible to employ rayon, polyester, nylon, polypropylene, and polyethylene fibers. If necessary, composite fibers composed of two types of fibers having different melting points, for example, core-sheath type fibers and side-by-side type fibers, may be used. The above-enumerated fibers may be used either individually or in combination of two or more thereof.

The fibers described above may take on the form of continuous filaments or staple fibers. Where the fibers described above take on the form of staple fibers, the fiber length is preferably from 1.0 to 5.0 cm. Where the fiber length falls within this range, the web can be produced uniformly, the feeling of the obtained nonwoven fabric can be kept good, and sufficient effects of wiping off dust, debris or the like can be obtained.

The fiber diameter of the fibers described above is not limited to a specific value and is preferably from 1.0 to 2.0 deniers. Where the fiber diameter falls within this range, the web can be produced uniformly, the feeling of the obtained nonwoven fabric can be kept good, and sufficient effects of wiping off dust, debris or the like can be obtained.

The basis weight of the nonwoven fabric of the present invention is, in general, from 30 to 50 $g/m^2$, preferably from 35 to 45 $g/m^2$. If the basis weight of the nonwoven fabric in accordance with the present invention is smaller than 30 $g/m^2$, the performance of the liner of a floppy disk may be deteriorated, the performance of wiping off dust, debris or the like may be impaired, and the magnetic medium of a floppy disk may be unfavorably damaged. If the basis weight of the nonwoven fabric of the present invention is larger than 50 $g/m^2$, thickness and toughness of the nonwoven fabric may increase, the rotation torque of the floppy disk may become high, thereby impairing smooth rotation of the floppy disk.

The nonwoven fabric for a liner of a floppy disk of the present invention is produced by applying the foregoing binder to the fibers. No limitation is imposed on process of producing the nonwoven fabric. According to a conventional process, the nonwoven fabric can be prepared by forming a web, which will be described later, from the fibers described above, and impregnating the web with the binder.

The preferred process for producing a nonwoven fabric for a liner of a floppy disk of the present invention may be carried out by making reference to the processes described in "Fundamentals and Application of Nonwoven Fabric," Japan Textile Machinery Association, p. 139; "Development and Application of Functional Nonwoven Fabric," CMC, p. 29; and U.S. Pat. Nos. 2,719,795 and 2,719,802 which are incorporated herein by reference. The process will be described below.

The preferred process for producing a nonwoven fabric for a liner of a floppy disk in accordance with the present invention comprises the steps of:

(i) foaming a binder comprising:
   (a) an emulsion obtainable from the above-mentioned polymerizable unsaturated monomer having a functional group and the above-mentioned other polymerizable unsaturated monomers capable of undergoing copolymerization with said polymerizable unsaturated monomer, and
   (b) the above-mentioned melamine compound having a methylol group, and
(ii) applying the foamed binder to a web.

As the binder in the process for producing the nonwoven fabric, the above-described binders employed in the nonwoven fabric of the present invention should preferably be employed.

The web is, in general, prepared by a carding machine. However, the process for preparing the web is not limited thereto and any other method such as a spun bonding method and a spun lacing method may be used.

Thereafter, the binder is applied to the web thus obtained. At this time, the binder is foamed and is then applied to the web (foam coating). When foaming the binder, the binder may be processed with a conventional mixing machine. i.e., a mixer, a foaming machine, or the like. After the web has been impregnated with the foamed binder, an excessive amount of the binder is removed with a pair of rolls such as a mangle. When foaming the binder, if the foaming property of the binder of itself is insufficient, a surface active agent for improving the foaming properties may be added to the binder. No limitation is imposed on the type and the amount of the surface active agent to be added.

As another method of applying the binder to the web, a method wherein the binder is sprayed to the web may be employed.

After the binder has been applied to the web, water or the organic solvent contained in the binder is removed by drying, the binder is cured, and the nonwoven fabric is thereby obtained. As the method of drying the web, to which the binder has been applied, and curing the binder, hot-air treatment, heated roll treatment, infrared-ray treatment, microwave treatment, heated calender treatment, or the like, may be employed. Any of other methods may be used for this purpose. The temperature suitable for curing the binder is, in general, 110° C. or higher.

The web, on which the binder has been cured in the manner described above, is worked into the nonwoven fabric. Thereafter, when necessary, the fibers constituting the nonwoven fabric may be thermally fused and bonded with one another. Further, if necessary, the nonwoven fabric may be subjected to embossing, thereby strengthening the nonwoven fabric.

The present invention further provides a floppy disk, in which the nonwoven fabric described above is employed as a liner. The floppy disk in accordance with the present invention comprises a magnetic disk having magnetic layers formed on opposite surfaces thereof, two liners disposed such that they may be in contact with the respective surfaces of the magnetic disk, an upper shell, and a lower shell. The magnetic disk has a hub which is secured to the magnetic disk via a ring. When the floppy disk is loaded into a disk drive unit, the hub of the magnetic disk is engaged with a hub drive mechanism and is rotated by it.

The upper shell and the lower shell are provided with cutaway portions for allowing the magnetic heads of the disk drive unit to access the magnetic disk. The cutaway portions are usually covered by shutters disposed to cover the cutaway portions. The shutters can be slid by the force of shutter springs.

The two liners are respectively disposed between the upper shell and the magnetic disk and between the magnetic disk and the lower shell. The liners are positioned at least in approximately the same space as the magnetic layers of the magnetic disk. The liners are provided with cutaway portions, which are approximately identical with the cutaway portions of the upper shell and the lower shell. The positions of the cutaway portions of the liners are caused to coincide with the positions of the cutaway portions of the upper shell and the lower shell such that the magnetic heads can access the magnetic layers of the magnetic disk.

The liners are respectively secured to the upper shell and the lower shell such that the liners may not move and may not hinder the magnetic heads from accessing the magnetic layers of the magnetic disk through the cutaway portions. The liners are secured to the upper shell and the lower shell with, for example, spot welding such that the positions of the cutaway portions of the liners may coincide with the positions of the cutaway portions of the upper shell and the lower shell.

A lifter is disposed between the lower shell and the corresponding liner. With the lifter, the liners and the magnetic disk are brought into close contact with each other. Thus, the surfaces of the magnetic disk are cleaned.

The present invention will further be illustrated by the following nonlimitative examples. In the examples described below, all the parts represents the parts by weight unless otherwise specified.

EXAMPLE 1

Three hundred and fifty parts of water was introduced into a separable flask provided with a stirrer, a thermometer and a reflux condenser. The temperature of water is raised to 80° C. while stirring the water and replacing the inside of the flask by nitrogen. An emulsified mixture had been prepared in advance by mixing 145 parts of water, 231.0 parts of ethyl acrylate, 2.5 parts of acrylic acid, 10.2 parts of N-monomethylol acrylamide, 1.75 parts of ammonium persulfate, and 28 parts of a surface active agent (Emal 20c, supplied by Kao Corporation, solid content 25%) while stirring. The emulsified mixture was added dropwise into the separable flask over two hours, and polymerization was carried out. The reaction mixture was then matured for two hours at 80° C. and cooled. In this manner, an acrylic emulsion (A) was obtained (nonvolatile content 40% by weight, pH=3.0).

A melamine compound having a methylol group (Sumitex Resin M-3, supplied by Sumitomo Chemical Co., Ltd.) was mixed with the acrylic emulsion (A) thus obtained so that the solid content ratio of melamine compound:acrylic emulsion (A) might become equal to 95:5. Thereafter, the resulting mixture was diluted with water, and a binder having a solid content concentration of 8% by weight was thereby prepared. The binder was foamed with a mixer, and the obtained foamed binder was coated to a rayon web so that the amount of the binder impregnated might be 15% by weight (solid content). Thereafter, the rayon web was dried and heat treated at 150° C. for 10 minutes. In this manner, the fibers of the web were bonded with one another, and a nonwoven fabric was obtained.

As for the nonwoven fabric obtained in this manner, the degree of scratching on the surface of the magnetic medium of a floppy disk, the amount of dust generated, and the durability were measured with the methods described below. The results obtained are shown in Table 1.

Degree of scratching on magnetic medium

The nonwoven fabric of 2 cm² was pushed against the magnetic medium for a floppy disk by applying a load of 360 g. In this state, the medium was rotated at a rotation speed of 100 rpm for one hour by using an abrasion tester (Model FM-5S supplied by Sanko Seisakusho K. K.). After one hour of rotation, the degree of scratching on the surface of the medium was judged visually.

Amount of dust generated

The nonwoven fabric was cut into ten pieces having a size of 10 cm×10 cm. Ultrasonic vibration was carried out for 0.2 second with a ultrasonic vibrator (Model No. 8400 supplied by Branson Co., Ltd.). The number of lint generated by the ultrasonic vibration was counted with a particle counter (KC-20 supplied by Rion Co., Ltd.). The number of lint having a size of 5 to 10 μm was taken as the value representing the amount of dust generated from the nonwoven fabric.

Durability test

A magnetic medium for a floppy disk having a regeneration output power of not lower than a predetermined level was incorporated into a shell, to which the nonwoven fabric had been secured as a liner. In this manner, a floppy disk for evaluation was assembled. The floppy disk was rotated 10,000,000 passes. After the rotation was carried out, the regeneration output power was measured. This operation was carried out for ten floppy disks, and the number of the floppy disks having errors in the regeneration output was counted.

EXAMPLE 2

The same procedure as that in Example 1 was carried out, except that the mixing ratio of the acrylic emulsion (A) to the melamine compound having a methylol group in Example 1 was changed to 90:10. The obtained foamed binder was coated to a rayon web such that the amount of the binder impregnated might be 13% by weight (solid content). In this manner, a nonwoven fabric was obtained. The performance of the nonwoven fabric thus obtained was measured in the same manner as that in Example 1. The results obtained are shown in Table 1.

Comparative Example 1

The acrylic emulsion (A) having been obtained in Example 1 was used alone without being mixed with the melamine compound having a methylol group. The acrylic emulsion (A) was coated to a rayon web such that the amount of the emulsion impregnated might be 15% by weight (solid content). In this manner, a nonwoven fabric was obtained. The performance of the nonwoven fabric thus obtained was measured in the same manner as that in Example 1. The results obtained are shown in Table 1.

Comparative Example 2

A web composed of nylon and rayon fibers (weight ratio 1:1) was heat embossed, and a nonwoven fabric was thereby obtained. This nonwoven fabric was not impregnated with the acrylic emulsion (A) and the melamine compound having a methylol group. The performance of the nonwoven fabric thus obtained was measured in the same manner as that in Example 1. The results obtained are shown in Table 1.

TABLE 1

|  | Examples | | Comparative Examples | |
| --- | --- | --- | --- | --- |
|  | 1 | 2 | 1 | 2 |
| Binder |  |  |  |  |
| Emulsion (parts) | 95 | 90 | 100 | Heat |
| Melamine (parts) | 5 | 10 | 0 | Emboss |
| Amount of Binder Impregnated (%) | 14 | 15 | 15 | (#246) |
| Basis Weight (g/m$^2$) | 37 | 39 | 36 | 38 |
| Degree of Scratching | Not Observed | Not Observed | Slishtly Observed | Not Observed |
| Amount of Dust Generated (pieces) | 9 | 4 | 20 | 200 |
| Durability (n = 10) | 0/10 | 0/10 | 8/10 | 3/10 |

Many other variations and modifications of the invention will be apparent to those skilled in the art without departing from the spirit and scope of the invention. The above-described embodiments are, therefore, intended to be merely exemplary, and all such variations and modifications are intended to be included within the scope of the invention as defined in the appended claims.

What is claimed is:

1. A nonwoven fabric which generates little or no lint dust or debris when used as a liner for a floppy disk, comprising a fibrous web produced by applying to the fibers thereof a foamed binder composition comprising:

(a) an emulsion obtainable from a polymerizable unsaturated monomer having a functional group and other polymerizable unsaturated monomers capable of undergoing copolymerization with said polymerizable unsaturated monomer, and (b) a cross-linking agent comprising a melamine compound having a methylol group which functions to prevent binder migration to the magnetic surface of a floppy disk when the non-woven fabric is used as a liner therefor; and effecting reaction within the composition applied to the fibers of the fibrous web.

2. The nonwoven fabric according to claim 1, wherein the functional group is selected from the group consisting of a methylol group, a carboxyl group, a hydroxyl group and an epoxy group.

3. The nonwoven fabric according to claim 1, wherein said polymerizable unsaturated monomer having a functional group is selected from the group consisting of acrylamide derivatives, methacrylamide derivatives, acrylic acid, methacrylic acid, 2-hydroxyethyl acrylate, and 2-hydroxyethyl methacrylate.

4. The nonwoven fabric according to claim 1, wherein said other polymerizable unsaturated monomers are selected from the group consisting of acrylic acid ester derivatives and methacrylic acid ester derivatives.

5. The nonwoven fabric according to claim 1, wherein said melamine compound has at least two methylol groups.

6. The nonwoven fabric according to claim 1, wherein the emulsion is obtainable by the copolymerization of said polymerizable unsaturated monomer having a functional group and said other polymerizable unsaturated monomers.

7. A process for producing a nonwoven fabric for a liner of a floppy disk, comprising the steps of:

(i) foaming a binder comprising:

(a) an emulsion obtainable from a polymerizable unsaturated monomer having a functional group and said other polymerizable unsaturated monomers capable of undergoing copolymerization with said polymerizable unsaturated monomer, and (b) a cross-linking melamine compound having a methylol group, and (ii) applying said foamed binder composition to the fibers of a non-woven web and effecting reaction within the binder composition applied to the fibers of the nonwoven web.

8. A floppy disk comprising the nonwoven fabric according to claim 1.

* * * * *